United States Patent
Kim

(10) Patent No.: US 9,435,087 B2
(45) Date of Patent: Sep. 6, 2016

(54) SPHERICAL BEARING AND PLASTIC BLOCK WITH SPHERICAL SURFACE FOR THE SAME

(71) Applicants: ISOLTECH CO., LTD., Seoul (KR); R.J. WATSON INC., Alden, NY (US)

(72) Inventor: Sung Kyu Kim, Yongin-si (KR)

(73) Assignees: ISOLTECH CO., LTD., Seoul (KR); R.J. WATSON, INC., Alden, NY (US)

( * ) Notice: Subject to any disclaimer, the term of this patent is extended or adjusted under 35 U.S.C. 154(b) by 0 days.

(21) Appl. No.: 14/409,431

(22) PCT Filed: Mar. 6, 2013

(86) PCT No.: PCT/KR2013/001823
§ 371 (c)(1),
(2) Date: Dec. 18, 2014

(87) PCT Pub. No.: WO2013/191356
PCT Pub. Date: Dec. 27, 2013

(65) Prior Publication Data
US 2015/0191881 A1 Jul. 9, 2015

(30) Foreign Application Priority Data

Jun. 21, 2012 (KR) .................. 10-2012-0066603

(51) Int. Cl.
*F16C 29/02* (2006.01)
*E01D 19/04* (2006.01)
(Continued)

(52) U.S. Cl.
CPC .............. *E01D 19/046* (2013.01); *F16C 13/04* (2013.01); *F16C 13/06* (2013.01)

(58) Field of Classification Search
CPC .... E01D 19/046; F16C 29/001; F16C 33/20; F16C 33/201

USPC .................... 384/36, 38, 42; 52/167.4, 167.9
See application file for complete search history.

(56) References Cited

U.S. PATENT DOCUMENTS 4,320,549 A * 3/1982 Greb ..................... E01D 19/046
14/73.5
5,597,239 A * 1/1997 Scaramuzza .......... E01D 19/046
384/36
(Continued)

FOREIGN PATENT DOCUMENTS

DE          3517895 A1 * 11/1986 ........... E01D 19/046
JP          2008-045722      2/2008
(Continued)

OTHER PUBLICATIONS

International Search Report PCT/KR2013/001823 dated Jun. 14, 2013.

*Primary Examiner* — Phillip A Johnson
(74) *Attorney, Agent, or Firm* — Roberts Mlotkowski Safran Cole & Calderon, PC

(57) ABSTRACT

A spherical bearing is disclosed, which is easy to make, can be made small, and does not have a sticking problem of a spherical block. The spherical bearing includes a plastic spherical block made of plastic and including a convex spherical surface, a spherical groove member including a spherical groove with which the convex spherical surface engages and surface-contacts and allowing rotation with respect to the plastic spherical block, and a weight-delivering member installed opposite to the spherical groove member with the plastic spherical block in the middle, and wherein a frictional surface of the plastic spherical block rubbing against the spherical groove member or the weight-delivering member is made of engineering plastic such as PA, POM etc. having a hardness of 75D through 95D.

20 Claims, 5 Drawing Sheets

(51) Int. Cl.
*F16C 13/04* (2006.01)
*F16C 13/06* (2006.01)

(56) References Cited

U.S. PATENT DOCUMENTS

| | | | | |
|---|---|---|---|---|
| 6,021,992 | A * | 2/2000 | Yen | E04H 9/021 248/560 |
| 8,011,142 | B2 * | 9/2011 | Marioni | E04H 9/023 248/560 |
| 8,641,282 | B2 * | 2/2014 | Chuang | F16C 29/001 384/36 |
| 2009/0188179 | A1 * | 7/2009 | Huber | E04H 9/023 52/167.7 |
| 2010/0195942 | A1 * | 8/2010 | Tavecchio | E01D 19/04 384/36 |

FOREIGN PATENT DOCUMENTS

| | | |
|---|---|---|
| KR | 20-0319696 | 1/2003 |
| KR | 10-2005-0105423 | 11/2005 |
| KR | 10-0716106 | 5/2007 |
| KR | 10-2008-0097405 | 11/2008 |
| KR | 10-0956600 | 5/2010 |
| KR | 1020110018483 | 2/2011 |

* cited by examiner

SPHERICAL BEARING AND PLASTIC BLOCK WITH SPHERICAL SURFACE FOR THE SAME

TECHNICAL FIELD

The present invention relates to a spherical bearing used to support a massive structure such as an upper structure of a bridge and a spherical block for the same.

BACKGROUND ART

In general, a spherical bearing is installed between an upper structure of a bridge and a pier and delivers the weight from the upper structure to the pier, and also is installed widely in bridges which need functions of allowing the thermal expansion or contractions of the upper structure, supporting the dynamic weight when a car or a train starts or brakes, absorbing shock when an earthquake breaks out, and preventing the dislocation of the upper structure by a negative reaction, for example, a railroad bridge. Such a spherical bearing is going to be explained referring to FIG. 1.

FIG. 1 is a cross-sectional view showing an exemplary spherical bearing in a prior art.

The spherical bearing (10) shown in FIG. 1 is a supporting device, which is installed between an upper structure such as the superstructure of a bridge and a lower structure such as a pier and supports the upper structure on the lower structure. Such a spherical bearing (10) is used to support the upper structure safely while allowing up-and-down rotation of the upper structure, that is, tilting of the upper structure due to the difference in distribution of vertical weight to the front, rear, right, and left with a supporting point as a center when the dynamic weight when a regular vehicle or a train starts or brakes or an earthquake acts, and according to the usage of the spherical bearing allowing the upper structure to slide in a direction or both directions with respect to the lower structure through the thermal expansion or a horizontal load caused by starting or braking of the regular vehicle or train.

As shown in FIG. 1, a conventional spherical bearing (10) comprises a spherical block (20) having a partial shape of a sphere, a spherical groove member (30) formed in a spherical groove (31), and a weight-delivering member (40) for delivering the weight of an upper structure supported on the top to the spherical block (20) and sliding with respect to the spherical block (20).

The spherical block (20) includes a convex spherical surface (21) formed convexly downward, on the top surface is formed a slider-installing groove (22), and in the slider-installing groove (22) is installed a slider (23) such as PTFE. And on the surface of the convex spherical surface (21) is formed a chrome-plating layer (24).

In the lower portion of the spherical block (20) is installed the spherical groove member (30) made of metal. In this embodiment, the spherical groove member (30) is fixed on a lower structure such as a pier supporting the weight of the upper structure, and formed with a spherical groove (31) having a shape corresponding to the convex spherical surface (21) on the top surface therefore. In the spherical groove (31) is formed a slider-installing groove (32) along the surface thereof, in which the slider-installing groove (32) has a spherical shape and there is installed a slider (33) such as the PTFE that is curved spherically.

On the top side of the spherical block (20) is installed the weight-delivering member (40) made of metal. This weight-delivering member (40) has a flat bottom surface (41). On the bottom surface (41) of the weight-delivering member (40) is attached a stainless-steel plate (42).

The conventional spherical bearing (10) as in the above is very hard to manufacture since it must form slider-installing grooves (22, 32) for installing the sliders (23, 33) in the spherical groove member (30) and needs the slider (33) having a spherical shape.

In general, as shown in FIG. 1, for the spherical block (20) of a spherical base having the slider (33) such as PTFE on both top and bottom thereof, what is made of regular steel is used widely. Such a spherical type is used widely in Europe.

In cases, for the spherical block (20), what is made of high-strength brass may be used. In this case, a groove is formed on a surface of the spherical block (20) and a solid lubricant, graphite, is filled in the groove, reducing friction.

The brass has an excellent anti-abrasiveness, but since it is much more expensive than regular bearing material the traditional spherical bearing (10) using the brass spherical block (20) is very expensive.

Also, the brass spherical block (20) made of brass has a shortcoming that in some period after installation it gets stuck with the spherical groove member (30) or the weight-delivering member (40), failing to function as a spherical bearing.

The brass spherical block (20) made of brass is hard to manufacture because it must have grooves formed on the surface of the spherical block (20) for injecting graphite and the like.

Besides, the conventional spherical bearing (10) is heavy because the spherical block (20), the spherical groove member (30), and the weight-delivering member (40) must be all made of metal, and very hard to manufacture because the spherical block (20) must be made by melting the steel or brass in a high temperature and casting.

DISCLOSURE OF INVENTION

Technical Problem

An object of the invention is to provide a spherical bearing, in which there is no need to install sliders in a spherical block and a spherical groove member separately.

Another object of the invention is to provide a spherical bearing, in which there is no need to form separate slider-installing groove for installing sliders in a spherical block and a spherical groove member.

Still another object of the invention is to provide a spherical bearing, which is easy to manufacture.

Still another object of the invention is to provide a spherical bearing, which is much lighter and smaller than conventional spherical bearing.

Still another object of the invention is to provide a plastic spherical block, which may be used suitably in the spherical bearing according to the invention.

Still another object of the invention is to provide a spherical bearing improved by finding and applying the most appropriate engineering plastic out of various kinds of engineering plastic and a plastic spherical block for the same.

Solution to Problem

A spherical bearing according to the invention is installed between an upper structure and a lower structure and supporting the upper structure on the lower structure, and the spherical bearing comprises: a plastic spherical block made of plastic and including a convex spherical surface bulging upward or downward; a spherical groove member including a spherical groove with which the convex spherical surface engages and surface-contacts and allowing rotation with respect to the plastic spherical block; and a weight-delivering member installed opposite to the spherical groove member with the plastic spherical block in the middle and delivering a weight of the upper structure to the plastic spherical block or receiving the weight of the upper structure from the plastic spherical block and then delivering to the lower structure, wherein a frictional surface of the plastic spherical block rubbing against the spherical groove member or the weight-delivering member is made of an engineering plastic having a hardness of 75 D through 95 D, and wherein the engineering plastic includes one selected from the group consisting of polyamide (PA), polyacetal or polyoxymethylene (POM), polyethylene terephthalate (PET), polysulfone resin (PSU), polyether sulfone (PES), polyphenylene sulphide (PPS), polyphenylene sulfone (PPSU), polyether imide (PEI), polyamide imide (PAI), polybenzimidazole (PBI), polyimide (PI), and polyether ether ketone (PEEK).

The hardness of the frictional surface is preferably from about 83D to about 85D.

A coefficient of static friction of the plastic spherical block is preferably smaller than 0.1.

In certain embodiments, grooves may be formed on the frictional surface of the plastic spherical block, and lubricant may be filled in the grooves.

Preferably a stainless steel plate or a chrome-plating layer is formed on the spherical groove member or a surface of the weight-delivering member that contacts the frictional surface.

An opposite surface to the convex spherical surface of the plastic spherical block may include a flat frictional surface, and the weight-delivering member may be movable relatively horizontally in both directions of right-and-left and front-and-rear with respect to the plastic spherical block while surface-contacting the frictional surface.

In certain embodiments, an opposite surface to the convex spherical surface of the plastic spherical block may include a flat frictional surface, and the weight-delivering member is movable relatively horizontally in a direction of right-and-left or front-and-rear with respect to the plastic spherical block while surface-contacting the frictional surface, and at corresponding locations on both front-rear or left-right of the spherical groove member and the weight-delivering member may be formed a guiding portion and a guided portion that guide a horizontal translation of the weight-delivering member in the one direction with respect to the spherical groove member and prevent a horizontal translation in a direction vertical to the one direction.

The guiding portion and the guided portion may be a groove formed straightly and a protrusion inserted to the groove.

A side surface of the guiding portion or the guided portion may protrude convexly sideways in a shape of arc or dents concavely.

In certain embodiments, at corresponding locations on both front-rear or left-right of the spherical groove member and the weight-delivering member may be formed a caught stop and a catching stop for preventing the weight-delivering member and the spherical groove member from dislocating from each other by engaging each other from up and down.

In a certain embodiment, a first ring groove and a second ring groove may be formed in corresponding locations of the spherical groove member and the weight-delivering member respectively, and with the first ring groove and the second ring groove may engage a ring member for limiting mutual horizontal translation between the spherical groove member and the weight-delivering member, a part of which being inserted to the first ring groove and another part of which being inserted to the second groove ring.

The ring member may be made of engineering plastic.

The entire plastic spherical block may be made of engineering plastic.

Preferably, a tensile elongation at break of the plastic spherical block may be 15% or larger, a density of the plastic spherical block is 1.14-1.15 g/cm$^3$, and a compressive strength of the plastic spherical block is 950-1,100 kg/cm$^2$.

In cases, the plastic spherical block may be formed with a metal body having a convex spherical surface and a bump and dent surface on a surface of which bumps and dents are formed on an opposite surface of the convex spherical surface, and a contacting plate formed by the engineering plastic installed on the bump and dent surface.

A chrome plating layer may be formed on the surface of the convex spherical surface and the bumps and dents may be formed on the spherical groove.

The spherical bearing of claim 1, wherein the plastic spherical block includes a core material made of metal and an engineering plastic layer enclosing the core material.

In cases, a groove or a through hole may be formed in the core material and the engineering plastic may be pressed in to the groove or through hole.

In one of the spherical groove member and the weight-delivering member may be formed a protruding portion protruding upward or downward along an edge, and between other one of the spherical groove member and the weight-delivering member and the protruding portion may be installed a horizontal elastic device supporting the weight-delivering member at least in a horizontal direction with respect to the spherical groove member elastically.

Each of top and bottom surfaces of the plastic spherical block may include a frictional surface forming a convex spherical surface and the weight-delivering member may comprise a spherical groove surface-contacting the frictional surface.

A plastic spherical block for spherical bearing according to the present invention is formed with an engineering plastic with a hardness of 75 D through 95 D, and the engineering plastic includes one selected from the group consisting of polyamide (PA), polyacetal or polyoxymethylene (POM), polyethylene terephthalate (PET), polysulfone resin (PSU), polyether sulfone (PES), polyphenylene sulphide (PPS), polyphenylene sulfone (PPSU), polyether imide (PEI), polyamide imide (PAI), polybenzimidazole (PBI), polyimide (PI) and polyether ether ketone (PEEK).

Preferably, a tensile elongation at break of the plastic spherical block is 15% or larger, a density of the plastic spherical block is 1.14-1.15 g/cm$^3$, and a compressive strength of the plastic spherical block is 950-1,100 kg/cm$^2$.

Advantageous Effects of Invention

A spherical bearing according to the invention does not need a separate slider to be installed in a spherical block and a spherical groove member and therefore is easy to make because a separate a slider-installing groove for installing the slider does not have to be formed in the spherical block and the spherical groove member.

The spherical bearing according to the invention is much lighter and smaller than conventional spherical bearing because the spherical block is made of engineering plastic.

The spherical bearing according to the invention can get rid of a central plate (bearing block of a shape of cube) of a conventional seismic isolator device (refer to FIG. 12), dispenses with a groove for installing a slider such as PTFE, can be reduced in size, and is excellent in vertical resistance.

A spherical block according to the invention is rust-resistant, free from sticking problem of the spherical groove member and the weight-delivering member, and has a long life.

The spherical block according to the invention, since it has a good sliding property due to the low coefficient of static friction and an excellent anti-abrasion property than the PTFE, has a long life and maintains the initially installed state for a long time.

BEST MODE FOR CARRYING OUT THE INVENTION

Below, referring to the attached drawings, preferable embodiments of the invention are going to be described in detail.

Figure 1:
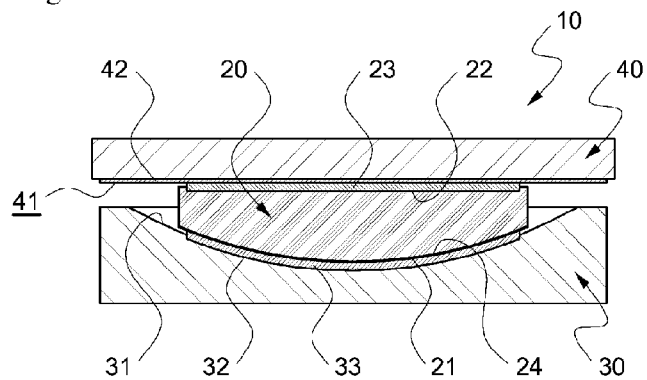
FIG. 1 is a cross-sectional view showing an example of a spherical bearing in a prior art.
Figure 2:
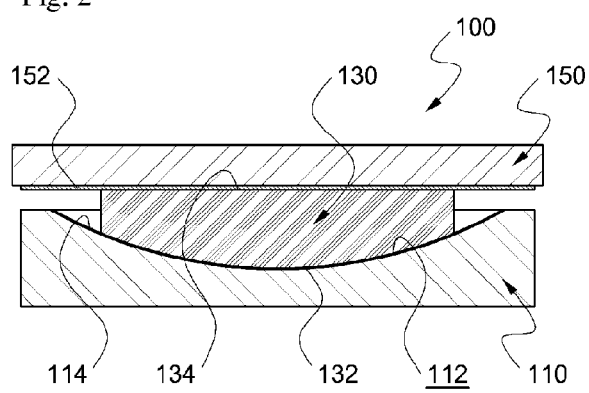
FIG. 2 is a cross-sectional view showing an example of a spherical bearing for operating in both directions according to the invention.

FIG. 2 is a cross-sectional view showing an example of a spherical bearing for operating in both directions according to the invention.

Referring to FIG. 2, the spherical bearing (100) according to the invention comprises a spherical groove member (110). On a top surface of the spherical groove member (110) is formed a spherical groove (112). This spherical groove (112) is a part which a convex spherical surface (132) of a plastic spherical block (130) described later engages and surface-contacts, and its curvature is preferably same as that of the convex spherical surface (132). On a surface of such spherical groove (112) is formed a chrome-plating layer (114). The chrome-plating layer (114) is for reducing friction against the plastic spherical block (130).

Figure 16:
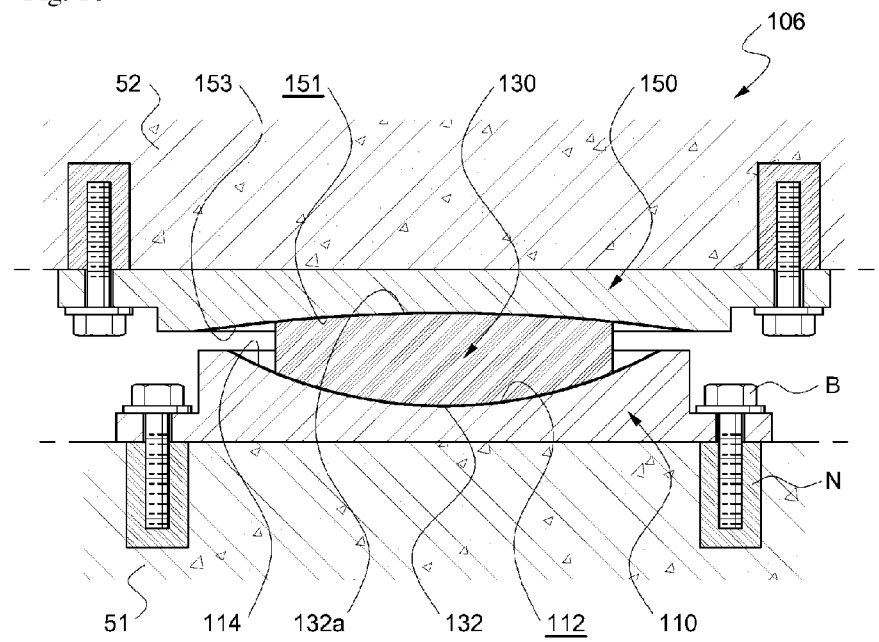
FIG. 16 is a cross-sectional view showing a spherical bearing according to still another embodiment of the invention.

This spherical bearing (100) is allowed to rotate upward and downward with respect to the plastic spherical block (130). Thus the plastic spherical block (130) may be tilted to right-left or to front-rear or to right-left and front-rear with respect to a horizontal plane while engaging the spherical groove member (110). Such spherical groove member (110) is made of metal, and a portion that is fixed to a lower structure of bridge, etc. through welding or by foundation bolt and nut and the like as shown in FIG. 16.

The spherical groove member (110) sometimes may be flipped and installed on a bottom portion of a upper structure. In such a case, a weight-delivering member (150) that is described later is installed in the lower structure, and the plastic spherical block (130) is flipped upside down and installed. This point is going to be described later referring to FIG. 17.

The spherical bearing (100) according to the invention comprises a weight-delivering member (150) installed opposite to the spherical groove member (110) with the plastic spherical block (130) in the middle that is described later. This weight-delivering member (150) is installed on the bottom surface of the upper structure such as the superstructure of a bridge, delivers the weight of the upper structure to the plastic spherical block (130), and is slidable right-to-left and front-to-rear with respect to the plastic spherical block (130). On the bottom surface of such weight-delivering member (150) is attached a slider (152) made of stainless steel plate, etc. This slider (152) is for reducing friction against the plastic spherical block (130).

The spherical bearing (100) according to the invention provides the plastic spherical block (130) made of engineering plastic.

The plastic spherical block (130) is different from conventional spherical bearings made of metal such as brass, which is made of plastic. Making the spherical block with plastic is not obvious such that one skilled in the art can invent that easily, and requires a distinct inventive step of changing conception.

The plastic spherical block (130) has a convex spherical surface (132) that is convex downward. This convex spherical surface (132) is a frictional surface applying friction against a surface of the spherical groove (112). On an opposite surface to the convex spherical surface (132) is provided a frictional surface including a plane (134).

For the engineering plastic used to make the plastic spherical block (130), the shore hardness must be at least 75 D. If one having less than 75 D is used, the plastic spherical block (130) made of engineering plastic can show too much slack even under a weight of about 450 kg/cm$^2$, a design compressive strength of conventional PTFE, and expand too much at a contacting portion of the slider (152) and the chrome-plating layer (114), generating crack.

And it is impossible to make it show no slack under the weight of about 450 kg/cm², but if the hardness increases higher and higher as 76 D, 77 D, 78 D, 79 D, 80 D, 81 D, 82 D, 83 D . . . , the degree of slack is reduced gradually, and if the hardness reaches about 83 D the slack becomes ignorable.

However, if the plastic spherical block (130) of too high hardness over 95 D is used, the brittleness of the plastic spherical block (130) made of engineering plastic gets larger, making the engineering plastic inappropriate to be used as a spherical block.

The engineering plastic having a range of hardness 75 D-95 D may be used as the plastic spherical block (130) of the spherical bearing (100) according to the invention and the optimal range of hardness is 83 D-85 D.

Especially, a result of testing a wearing rate on the engineering plastic of hardness of 83 D-85 D and the PTFE that has been used as slider so far shows that the PTFE's wearing rate was 0.63-47.00%, while that of the engineering plastic having a range of hardness 75 D-95 D was as dramatically low as 0.00-0.33% under the same condition.

A coefficient of static friction (coefficient of static friction against stainless steel) of such plastic spherical block (130) is preferably smaller than 0.1. In order to be used for a regular bridge, the coefficient of static friction of the engineering plastic spherical block (130) is preferably below 0.05.

A modulus of elasticity of the plastic spherical block (130) is suitably 2,000-5,000 Mpa, and a tensile elongation at break should be above 15%.

One with a high coefficient of friction can form concave grooves on a surface of the plastic spherical block (130) or corresponding surface and, of course, they can be filled with lubricant such as grease and then used.

Through the research processes, the inventor could find that out of many kinds of engineering plastics polyamide (PA), polyacetal or polyoxymethylene (POM), polyethylene terephthalate (PET), polysulfone resin (PSU), polyether sulfone (PES), polyphenylene sulphide (PPS), polyphenylene sulfone (PPSU), polyether imide (PEI), polyamide imide (PAI), polybenzimidazole (PBI), polyimide (PI) and polyether ether ketone (PEEK) satisfy the above conditions for forming the spherical bearing (100) and the plastic spherical block (130) according to the invention.

Among the above engineering plastics, suitable one for making the plastic spherical block according to the invention has a density of about 1.14-1.15 g/cm³, and compressive strength of about 950-1,100 kg/cm².

And one for using for the spherical bearing and plastic spherical block according to the invention has a coefficient of dynamic friction of the plastic spherical block against stainless steel in the speed range of 0-400 mm/s, which is 0.08-0.15 when the load is 18 Mpa, 0.04-0.10 when the load is 35 Mpa, and 0.03-0.08 when the load is 69 Mpa.

The spherical bearing (100) described in the above may be installed flipped upside down. This applies to the embodiments described below. In such a case, a weight-delivering member (150) is installed in the lower structure such as pier, and performed a function of receiving the weight of the upper structure from the plastic spherical block (130) and delivering it to the lower structure.

The spherical bearing (100) shown in FIG. 2 is installed at a both-direction-operational position allowing displacement of the upper structure in both a direction of bridge and a direction perpendicular to bridge.

Figure 3:
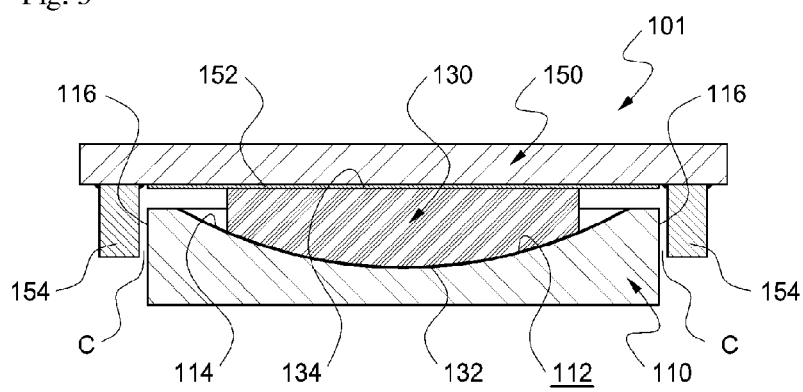
FIG. 3 is a cross-sectional view showing an example of a spherical bearing for operating in a single direction according to the invention.

FIG. 3 is a cross-sectional view showing an example of a spherical bearing for operating in a single direction according to the invention.

Unlike shown in FIG. 2, by installing protrusions (154) so as to protrude downward along both edges of the weight-delivering member (150) and facing both side surfaces of the spherical groove member (110) respectively, a spherical bearing (101) for being used at an one-direction-operational place may be formed. Here, the protrusion (154) is installed with a bit of crevice (C) for allowing the weight-delivering member (150) to rotate and then be tilted to the left or right. Since usually the tilt tolerance of the weight-delivering member (150) in a spherical bearing is about 0.035 rad, the interval of the crevice (C) may be determined so as to allow the weight-delivering member (150) to rotate as much as 0.035 rad.

In FIG. 3, at an inner side surface of the protrusion (154) is attached a slider such as stainless steel, and on both side surfaces of the spherical groove member (110) facing each other may be attached sliders that are made of Du tape or high-strength engineering plastic.

Here, the two protrusions (154) on both sides are guided by both right and left side surfaces (116) of the spherical groove member (110), guide a horizontal translation in a direction of the weight-delivering member (150) with respect to the plastic spherical block (130), and prevent a horizontal translation in a direction perpendicular to the direction. Of course, for this, the protrusion (154) and the two side surfaces (116) of the spherical groove member (110) must be formed straightly. Here, the two side surfaces (116) of the spherical groove member (110) perform a function of a guide, and the protrusion (154) works as a guided one that is guided by the guide.

In FIG. 3, if wanting to use the spherical bearing (101) for a fixed position, the protrusion (154) and the both side surfaces (116) of the spherical groove member (110) may be formed circularly, or the side surfaces (116) of the spherical groove member (110) may be made rectangular and the protrusion (154) may be installed at all four direction of left, right, front, and rear.

The rest of the plastic spherical block (130) and the like is same as what was explained referring to FIG. 2.

MODE FOR THE INVENTION

Figure 4:
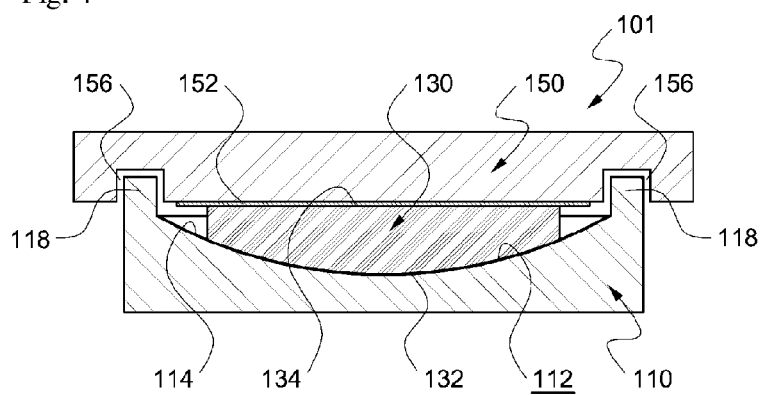
FIG. 4 is a cross-sectional view showing a variation of the spherical bearing in FIG. 3.

FIG. 4 is a cross-sectional view showing a variation of the spherical bearing in FIG. 3.

In cases, as shown in FIG. 4, by forming grooves (156) with an interval on both right and left sides of the weight-delivering member (150) and forming protrusions (118) with an interval at the spherical groove member (110) at corresponding locations to the grooves (156) and having the top portion inserted in the groove (156), the spherical bearing (101) for an one-direction-operational place according to the invention may be formed. In such a case, the protrusion (118) works as a guide and the groove (156) works as a guided part.

In a case formed as in FIG. 4, it is a double-resisting structure because when the weight-delivering member (150) moves to the left or right the horizontal translation can be resisted at the left and right protrusions (118) respectively. Therefore the thickness of the protrusion (118) may be reduced.

In FIG. 4, in a case of using the spherical bearing (101) for a one-direction-operational place, the protrusion (118)

and the groove (156) are formed straightly and on all four directions, or the protrusion (118) and the groove (156) are formed circularly.

The rest is same as explained referring to FIG. 2.

Figure 5:
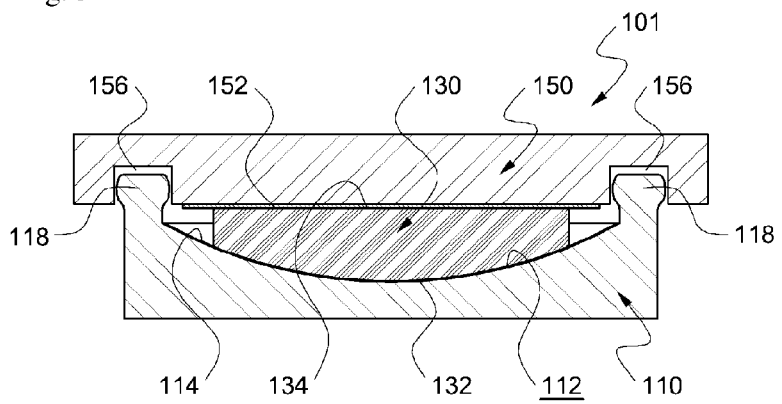
FIG. 5 is a cross-sectional view showing a variation of a protrusion in FIG. 4.

FIG. 5 is a cross-sectional view showing a variation of a protrusion in FIG. 4.

In cases, in order to prevent translating to the left and right maximally, both side surfaces of the protrusion (118) may be formed so as to protrude convexly sideways in a shape of arc. In such a case, while allowing the weight-delivering member (150) and the upper structure supported thereby to rotate, the horizontal translation in a direction of right-to-left can be prevented maximally.

In a case formed as in FIG. 5, since when the weight-delivering member (150) moves to the left or right the horizontal translation can be resisted at the left or right side of the protrusion (118) and a side surface of the protrusion (118) is in a state almost contacting a side wall of the groove (156), and therefore since the resistance exerts from the beginning of translation, it is configured that it receives much smaller shock force compared to the case of bumping after some translation. Also, since there is the double-resistance structure against the horizontal displacement it is possible to reduce resisting area, and as a result the thickness of the weight-delivering member (150) can be reduced by reducing the depth of the groove (156).

The rest is same as explained referring to FIG. 4.

Figure 6:
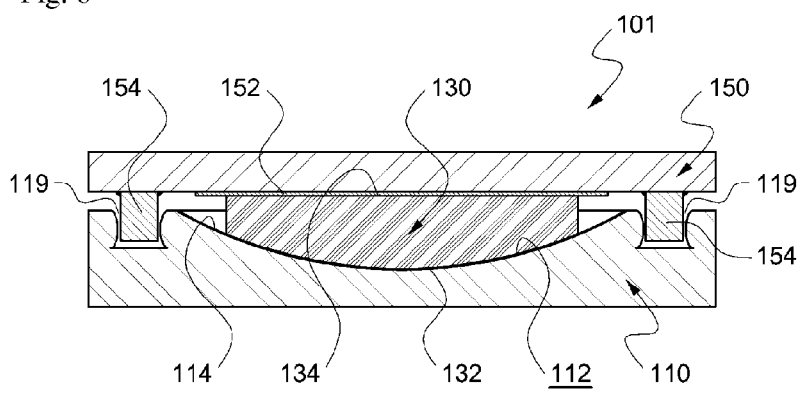
FIG. 6 is a cross-sectional view showing a variation of the spherical bearing in FIG. 3.

FIG. 6 is a cross-sectional view showing a variation of the spherical bearing in FIG. 3.

In cases, on both sides of the spherical groove (112) are formed grooves (119) and on both corresponding locations of the weight-delivering member (150) are formed the protrusions (154), so as to form the spherical bearing (101) according to the invention. At this point, both side walls of the groove (119) may be formed to protrude convexly sideways so as to contact side surface of the protrusion (154) inserted to the groove (119), or to have a small interval.

In the case of forming as shown in FIG. 6, since when the weight-delivering member (150) moves to the left or right the horizontal translation can be resisted at the both grooves (119) of the spherical groove member (110) to which the protrusion (154) is inserted and a side surface of the protrusion (154) is in a state almost contacting a side wall of the groove (119), and therefore since the resistance exerts from the beginning of translation, it is configured that it receives much smaller shock force compared to the case of bumping after some translation.

In FIG. 6, in a case of using the spherical bearing (101) for a one-direction-operational place, the protrusion (154) and the groove (119) are formed circularly or straightly, which can be formed on all four directions.

The rest is same as explained referring to FIG. 2.

Figure 7:
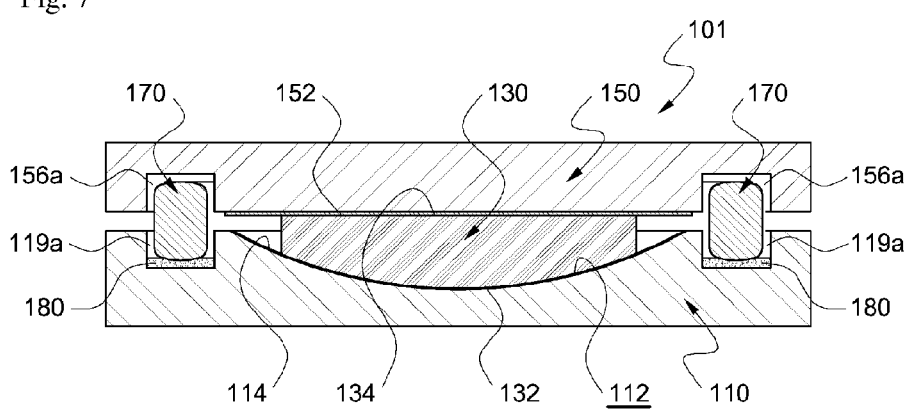
FIG. 7 is a cross-sectional view showing an example of spherical bearing for operating with a fixed position.
Figure 8:
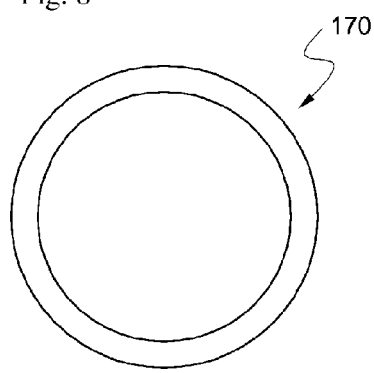
FIG. 8 is a plan view showing a ring body in FIG. 7.
Figure 9:
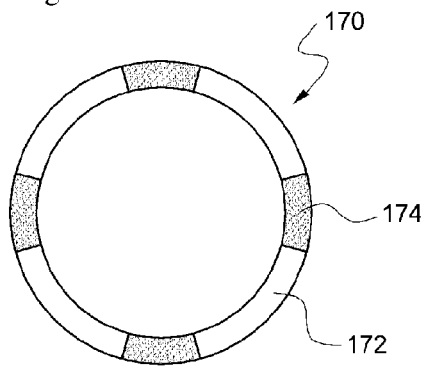
FIG. 9 is a plan view showing a variation of a ring body.

FIG. 7 is a cross-sectional view showing an example of spherical bearing for operating with a fixed position, FIG. 8 is a plan view showing a ring body in FIG. 7, and FIG. 9 is a plan view showing a variation of a ring body.

In cases, by forming a first ring groove (119*a*) at the spherical groove member (110) around the spherical groove (112) and a second ring groove (156*a*) at a corresponding location of the weight-delivering member (150) and inserting top and bottom of the ring body (170) as shown in FIG. 8 or FIG. 9 to the first and second ring grooves (119*a*, 156*a*) respectively, the spherical bearing (101) according to the invention may be formed.

In this case, the horizontal translation in a general direction of the weight-delivering member (150) with respect to the spherical block (130) is limited by the ring body (170).

The ring body (170) may be made of metal, but preferably one made of high-strength engineering plastic that is rustless is used.

The ring body (170), as shown in FIG. 8, does not have to be monolithic, but as shown in FIG. 9 one made by inserting rubbers (174) between arc-shaped ring pieces (172) that are made of metal or high-strength engineering plastic can be used, too.

Such a ring body (170) performs a function to limit mutual horizontal translation between the spherical groove member (110) and the weight-delivering member (150).

On the bottom of the ring body (170) is installed a rubber pad (180) or foamed resin.

In FIG. 7, if wanting to use the spherical bearing (101) for an one-direction-operational place, instead of the first ring groove (119*a*) and the second ring groove (156*a*) a groove may be formed straightly, and instead of the ring body (170) a straight member may be used.

The rest is same as explained referring to FIG. 2.

Figure 10:
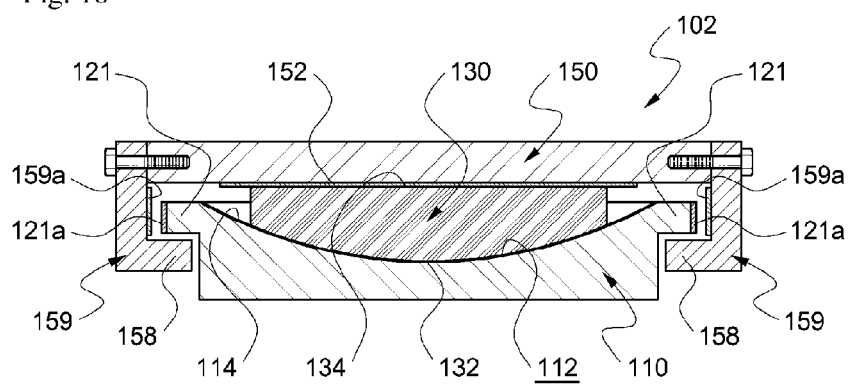
FIG. 10 is a cross-sectional view showing a spherical bearing having a function of resisting negative reactions.

FIG. 10 is a cross-sectional view showing a spherical bearing having a function of resisting negative reactions.

When a function to resist negative reaction is needed, it can be done by installing a catching stop (121) and a caught stop (158) for preventing the weight-delivering member (150) and the spherical groove member (110) from dislocating from each other in a up-and-down direction through being caught by each other at corresponding locations at both sides of front-rear or left-right of the spherical groove member (110) and the weight-delivering member (150).

On a side surface of the spherical groove member (110) and an inner surface of the catching member (159) are installed sliders (121*a*, 159*a*) made of PTFE, stainless steel, etc. respectively.

The rest is same as explained referring to FIG. 2.

Figure 11:
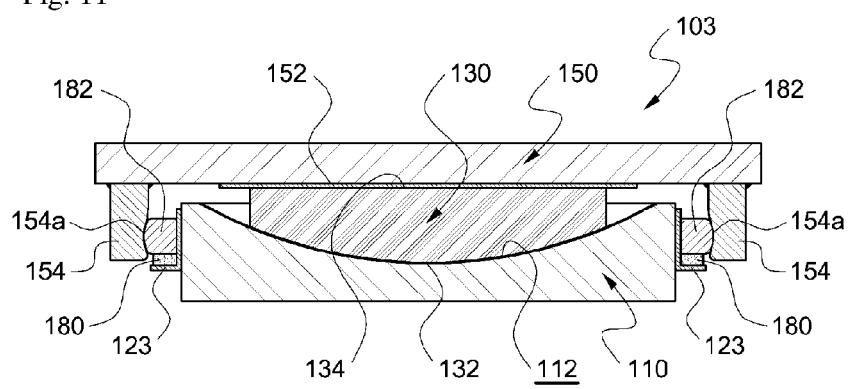
FIG. 11 is a cross-sectional view showing another variation of the spherical bearing in FIG. 3.

FIG. 11 is a cross-sectional view showing another variation of the spherical bearing in FIG. 3.

If wanting to reduce horizontal shock force acting between the spherical groove member (110) and the weight-delivering member (150), by attaching a supporting member (123) made of stainless steel and the like having L-shaped cross-section on both side surfaces of the spherical groove member (110), forming a concave portion (154*a*) dented concavely sideways in an arc shape on an inner side surface of the protrusion (154), and inserting an inserter (182) made of high-strength engineering plastic having a surface with a side surface protruding convexly sideways in an arc shape, a spherical bearing (103) according to the invention may be formed. On the bottom surface of the inserter (182) is inserted the rubber pad (180) or foamed resin, so as to be able to move up and down elastically.

And on the inner side surface of the protrusion (154) is attached a slider such as stainless steel or formed a chrome-plating layer, preferably.

In FIG. 11, if wanting to forming the spherical bearing (103) for a fixed position, it can be done by making all of outer surface of the spherical groove member (110), the supporting member (123), the inserter (182), and the protrusion (154) circular or making them straightly and installing them on all four directions. If wanting to form the spherical bearing (103) for an one-direction-operational place, it can be done by using both side surfaces of the spherical groove member (110), the right and left supporting member (123), the inserter (182), and the protrusion (154), that are all straight. Of course, in the front and rear thereof can be installed a stopper for limiting the translating distance in the front-rear direction.

Figure 12:
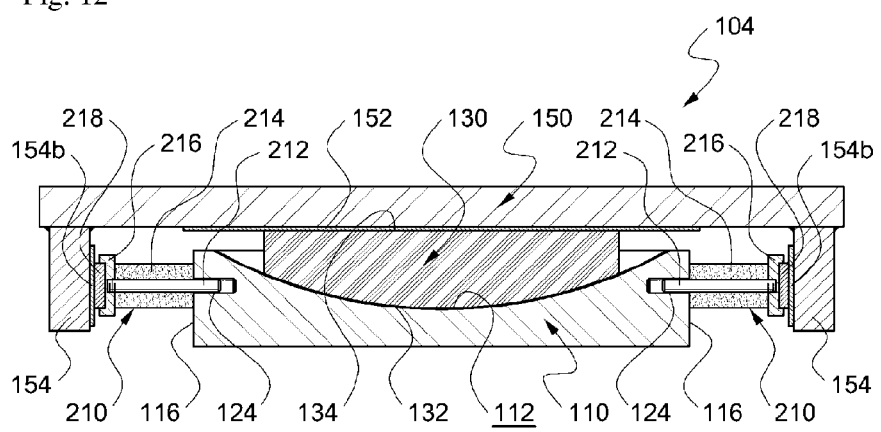
FIG. 12 is a cross-sectional view showing a spherical bearing having a seismic isolator function according to the invention.

FIG. 12 is a cross-sectional view showing a spherical bearing having a seismic isolator function according to the invention.

If wanting to impart a function of restorable seismic isolator, by installing the protrusion (154) at the weight-delivering member (150) away from both side surfaces (116) of the spherical groove member (110) and installing an elastic device (210) between the spherical groove member (110) and the protrusion (154), a restorable spherical bearing (104) with a seismic isolator function can be formed.

Preferably, the elastic device (210) may comprise an shaft (212), an elastic body (214) engaging a part of the outer surface of the shaft (212), and a contacting end (216) that is installed at an end of the shaft (212), prevents dislocating of the elastic body (214), and contacts the inner side surface of the protrusion (154). On a surface of the contacting end (216) is attached a slider (218) such as PTFE, and on the inner side surface of the protrusion (154) contacting thereto is attached a slider (154b) such as stainless steel plate.

In the spherical groove member (110) is formed a shaft-installing portion (124) to which a part of the shaft (212) is inserted and move right and left. In cases, the elastic device (210) is installed in the protrusion (154) and the contacting end (216) may be configured to contact the side surface of the spherical groove member (110).

Such an elastic device (210) may be installed to the right and left, to the front and rear, or to all four directions of right, left, front, and rear.

Also in this embodiment, as described referring to FIG. 2, the plastic spherical block (130) is made of engineering plastic. In case of using one made of engineering plastic as described referring to FIG. 2 for the plastic spherical block (130), a central plate (bearing block of a shape of cube) of a conventional seismic isolator device can be gotten rid of, a groove for installing a slider such as PTFE can be omitted, the size can be reduced, and the vertical resistance is increased.

If the PTFE being used as a slider conventionally is to have a dynamic coefficient of friction of about 0.07 against stainless steel, a small pressure of about 150 kg/cm$^2$ is needed. And, allowed compressive stress of polyurethane disc is about 350 kg/cm$^2$. In contrast, the plastic spherical block (130) made of engineering plastic as shown in the above has a high compressive strength of 950-1100 kg/cm$^2$, and since if it is to have a dynamic coefficient of friction of about 0.08 against stainless steel it requires a pressure of about 350 kg/cm$^2$, it can support larger weight than the conventional one. That is, according to the invention, the size of the spherical bearing (104) can be reduced drastically compared to the conventional one.

Since the plastic spherical block (130) made of engineering plastic according to the invention has a small coefficient of static friction in average and has an excellent sliding property, there is no need to form a groove in the plastic spherical block (130) and install a separate slider such as PTFE, and the anti-abrasion property is also excellent, such that its life is long and the initial installing state is maintained long.

A plastic spherical block made of engineering plastic according to the invention is rustless and shows no sticking phenomenon in the spherical groove member (110) or the weight-delivering member (150).

Figure 13:
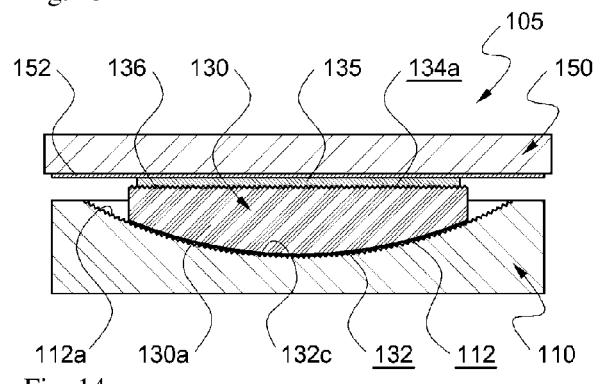
FIG. 13 is a cross-sectional view showing a spherical bearing according to another embodiment of the invention.

FIG. 13 is a cross-sectional view showing a spherical bearing according to another embodiment of the invention.

In cases, the plastic spherical block (130) can be formed with a metal main body (130a) having a convex spherical surface (132) and a bump and dent surface (134a) on a surface of which bumps and dents (136) are formed on an opposite surface of the convex spherical surface (132), and a contacting plate (135) made of engineering plastic installed in the bump and dent surface (134a). In this case, on the bottom surface of the weight-delivering member (150) is preferably attached a slider (152) such as stainless steel.

And on a surface of the convex spherical surface (132) is formed a chrome-plating layer (132c), and on a surface of the spherical groove (112) may be formed a bump and dent (112a).

The bumps and dents (112a, 136) formed on the main body (130a) of the plastic spherical block (130) and the spherical groove (112) can be formed as V-shaped notches by using a tool that has a sharp point and is made of metal with high hardness or by colliding sands through sand blasting or iron balls.

Figure 14:
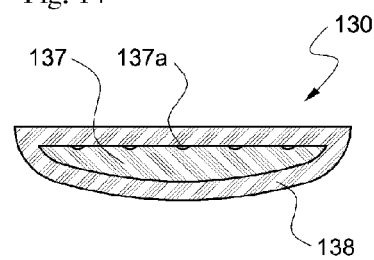
FIG. 14 is a cross-sectional view showing another example of a spherical block according to the invention.

FIG. 14 is a cross-sectional view showing another example of a spherical block according to the invention.

The plastic spherical block (130) according the invention may be formed with a core material (137) having a partially spherical shape made of metal inside and an engineering plastic layer (138) enclosing the core material (137). The engineering plastic layer (138) can use the same engineering plastic as explained referring to FIG. 2. Such a plastic spherical block (130) preferably may be made using insert injection molding, in which the engineering plastic layer (138) is formed around the core material (137) by injecting molten resin such as polyamide or polyacetal, etc. into the mold with a high pressure while the core material (137) is inserted in the mold.

And if necessary, on the surface of the core material (137) can be formed grooves (137a), such that the engineering plastic is pressure-injected into the groove (137a) and increases the engaging area between the core material (137) and the engineering plastic layer (138), increasing the mutual engaging force. The groove (137a) can have any shapes such as dot shape, straight line shape, curved line shape, etc. if it can increase the surface area of the core material (137) compared to the case of no grooves. On the surface of the core material (137) can be formed protrusions, and in such a case the portions between the protrusions correspond to the groove (137a).

Figure 15:
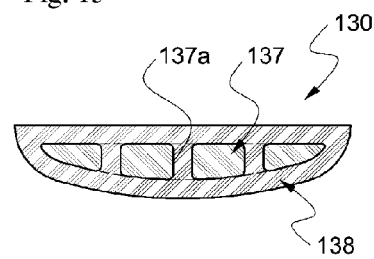
FIG. 15 is a cross-sectional view showing a variation of the spherical block in FIG. 14.

FIG. 15 is a cross-sectional view showing a variation of the spherical block in FIG. 14.

In cases, in the core material (137) can be formed through holes (137b) from top to bottom. There may be only one through hole (137b) through a central portion or a plurality of through holes (137b) symmetrically to the right and left. In such a case, the engineering plastic layer (138) toward the top surface of the core material (137) and the engineering plastic layer (138) toward the bottom surface of the core material (137) are connected to each other through the through holes (137b), such that the engineering plastic layer (138) maintains much more secured engaging state with the core material (137).

FIG. 16 is a cross-sectional view showing a spherical bearing according to still another embodiment of the invention.

FIG. 16 shows a spherical bearing (106) in which convex spherical surfaces (132, 132a) are formed on both top and bottom surface of the spherical block (130), and on the bottom surface of the weight-delivering member (150) are further formed a spherical groove (151) corresponding to the convex spherical surface (132a).

In FIG. 16, the spherical groove member (110) is fixed to a lower structure (51) such as pier through foundation nut (N) and bolt (B), and the weight-delivering member (150) is fixed to an upper structure (52) such as the superstructure of a bridge through foundation nut (N) and bolt (B). In cases, instead of the foundation nut (N) and bolt (B), a foundation bolt and nut can be used. In a certain case, the spherical groove member (110) and the weight-delivering member (150) can be fixed to the lower structure (51) and the upper structure (52) through welding. Of course, other fixing methods can be used, and two or more methods may be used together. This holds true to the other embodiments of the invention.

The spherical bearing (106) shown in FIG. 16 used to be called a pendulum bearing in particular. The convex spherical surfaces (132, 132a) on both top and bottom sides may be made so as to have the same curvature or different curvatures. In the spherical bearing (106) shown in FIG. 16, on a top surface of the spherical groove member (110) and a bottom surface of the weight-delivering member (150) is formed chrome-plating layers (114, 153).

While the spherical bearings in the previous embodiments do not have recovering force, the spherical bearing (106) shown in FIG. 16, because its top and bottom contacting surfaces are all spherical, has a recovering force in a horizontal direction by the action of the weight of the upper structure, the convex spherical surfaces (132, 132a), and the spherical grooves (112, 151) when a horizontal displacement occurs in an earthquake.

The adjustment of recovering force in the horizontal direction is possible through adjusting the curvatures of the convex spherical surfaces (132, 132a) and the spherical grooves (112, 151).

Figure 17:
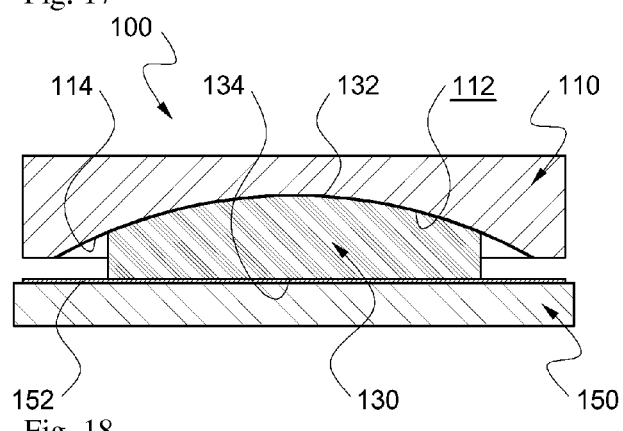
FIG. 17 is a cross-sectional view showing the spherical bearing in FIG. 2 flipped upside down.

FIG. 17 is a cross-sectional view showing the spherical bearing in FIG. 2 flipped upside down.

As shown in FIG. 17, the spherical groove member (110) can be disposed on the top of the plastic spherical block (130), and the weight-delivering member (150) can be disposed under the plastic spherical block (130) in use. In this embodiment, the convex spherical surface (132) of the plastic spherical block (130) is formed convexly upward.

In this case, the spherical groove member (110) is connected to the upper structure such as the superstructure of a bridge, and the weight-delivering member (150) is connected to the lower structure such as pier. Thus the plastic spherical block (130) moves to the left and right or to the front and rear riding the slider (152) installed on the top surface of the weight-delivering member (150), and the rotation of the upper structure and the spherical groove member (110) connected to the upper structure in an up-down direction is received at the convex spherical surface (132) of the plastic spherical block (130).

The weight-delivering member (150) delivers the weight of the upper structure received through the plastic spherical block (130) to the lower structure.

The rest is same as explained referring to FIG. 2.

Other spherical bearings described referring to FIGS. 3-13 and FIG. 16 may be used in a flipped state in an up-down direction as described in FIG. 17, too.

Figure 18:
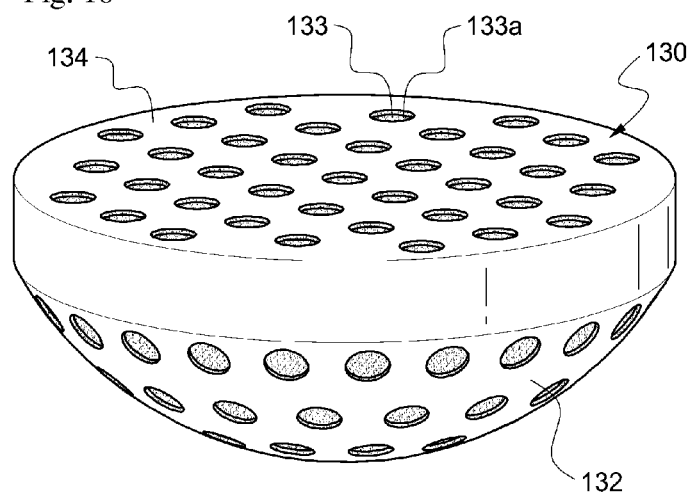
FIG. 18 is a perspective view showing another example of a spherical block according to the invention.

FIG. 18 is a perspective view showing another example of a spherical block according to the invention.

In cases, on frictional surfaces of top and bottom of the spherical block (130) may be formed small grooves (133), and a lubricant (133a) such as grease may be filled in the grooves (133), so as to obtain a fine lubricating. The one shown in FIG. 18 is especially useful when it is made of the engineering plastic having a large coefficient of friction.

The rest is same as explained in the above.

INDUSTRIAL APPLICABILITY

The present invention reduces the size and manufacturing cost of a spherical bearing, and increases manufacturing easiness and quality of the product.

The invention claimed is:

1. A spherical bearing installed between an upper structure and a lower structure and supporting the upper structure on the lower structure, the spherical bearing comprising:
    a plastic spherical block made of plastic and including a convex spherical surface bulging upward or downward;
    a spherical groove member including a spherical groove with which the convex spherical surface engages and surface-contacts and allowing rotation with respect to the plastic spherical block; and
    a weight-delivering member installed opposite to the spherical groove member with the plastic spherical block in the middle and delivering a weight of the upper structure to the plastic spherical block or receiving the weight of the upper structure from the plastic spherical block and then delivering to the lower structure,
    wherein a frictional surface of the plastic spherical block rubbing against the spherical groove member or the weight-delivering member is made of an engineering plastic having a hardness of 75 D through 95 D, and
    wherein the engineering plastic includes one selected from the group consisting of polyamide (PA), polyacetal or polyoxymethylene (POM), polyethylene terephthalate (PET), polysulfone resin (PSU), polyether sulfone (PES), polyphenylene sulphide (PPS), polyphenylene sulfone (PPSU), polyether imide (PEI), polyamide imide (PAI), polybenzimidazole (PBI), polyimide (PI), and polyether ether ketone (PEEK),
    wherein the entire plastic spherical block is made of engineering plastic.

2. The spherical bearing of claim 1, wherein the hardness of the frictional surface is from about 83 D to about 85 D.

3. The spherical bearing of claim 1, wherein a coefficient of static friction of the plastic spherical block is smaller than 0.1.

4. The spherical bearing of claim 3, wherein grooves are formed on the frictional surface of the plastic spherical block, and wherein lubricant is filled in the grooves.

5. The spherical bearing of claim 1, wherein a stainless steel plate or a chrome-plating layer is formed on the spherical groove member or a surface of the weight-delivering member that contacts the frictional surface.

6. The spherical bearing of claim 1, wherein an opposite surface to the convex spherical surface of the plastic spherical block includes a flat frictional surface, and wherein the weight-delivering member is movable relatively horizontally in both directions of right-and-left and front-and-rear with respect to the plastic spherical block while surface-contacting the frictional surface.

7. The spherical bearing of claim 1,
    wherein an opposite surface to the convex spherical surface of the plastic spherical block includes a flat frictional surface,
    wherein the weight-delivering member is movable relatively horizontally in a direction of right-and-left or front-and-rear with respect to the plastic spherical block while surface-contacting the frictional surface, and
    wherein at corresponding locations on both front-rear or left-right of the spherical groove member and the weight-delivering member are formed a guiding portion and a guided portion that guide a horizontal translation of the weight-delivering member in the one direction with respect to the spherical groove member and prevent a horizontal translation in a direction vertical to the one direction.

8. The spherical bearing of claim 7, wherein the guiding portion and the guided portion are a groove formed straightly and a protrusion inserted to the groove.

9. The spherical bearing of claim 7, wherein a side surface of the guiding portion or the guided portion protrudes convexly sideways in a shape of an arc or dents concavely.

10. The spherical bearing of claim 1, wherein at corresponding locations on both front-rear or left-right of the spherical groove member and the weight-delivering member are formed a caught stop and a catching stop for preventing the weight-delivering member and the spherical groove member from dislocating from each other by engaging each other in an up-down direction.

11. The spherical bearing of claim 1,
wherein a first ring groove and a second ring groove are formed in corresponding locations of the spherical groove member and the weight-delivering member respectively, and
wherein with the first ring groove and the second ring groove engages a ring member for limiting mutual horizontal translation between the spherical groove member and the weight-delivering member, a part of which being inserted to the first ring groove and another part of which being inserted to the second groove ring.

12. The spherical bearing of claim 11, wherein the ring member is made of engineering plastic.

13. The spherical bearing of claim 1, wherein a tensile elongation at break of the plastic spherical block is 15% or larger, a density of the plastic spherical block is 1.14-1.15 g/cm$^3$, and a compressive strength of the plastic spherical block is 950-1,100 kg/cm$^2$.

14. The spherical bearing of claim 1, wherein a chrome plating layer is formed on the surface of the convex spherical surface and the bumps and dents are formed on the spherical groove.

15. The spherical bearing of claim 1,
wherein in one of the spherical groove member and the weight-delivering member is formed with a protruding portion protruding upward or downward along an edge, and
wherein between the other one of the spherical groove member and the weight-delivering member and the protruding portion is installed a horizontal elastic device supporting the weight-delivering member at least in a horizontal direction with respect to the spherical groove member elastically.

16. The spherical bearing of claim 1, wherein each of the top and bottom surface of the plastic spherical block includes a frictional surface forming a convex spherical surface and the weight-delivering member comprises a spherical groove surface-contacting the frictional surface.

17. A spherical bearing installed between an upper structure and a lower structure and supporting the upper structure on the lower structure, the spherical bearing comprising:

a plastic spherical block made of plastic and including a convex spherical surface bulging upward or downward;

a spherical groove member including a spherical groove with which the convex spherical surface engages and surface-contacts and allowing rotation with respect to the plastic spherical block; and a weight-delivering member installed opposite to the spherical groove member with the plastic spherical block in the middle and delivering a weight of the upper structure to the plastic spherical block or receiving the weight of the upper structure from the plastic spherical block and then delivering to the lower structure, wherein a frictional surface of the plastic spherical block rubbing against the spherical groove member or the weight-delivering member is made of an engineering plastic having a hardness of 75 D through 95 D, and wherein the engineering plastic includes one selected from the group consisting of polyamide (PA), polyacetal or polyoxymethylene (POM), polyethylene terephthalate (PET), polysulfone resin (PSU), polyether sulfone (PES), polyphenylene sulphide (PPS), polyphenylene sulfone (PPSU), polyether imide (PEI), polyamide imide (PAI), polybenzimidazole (PBI), polyimide (PI), and polyether ether ketone (PEEK), wherein the plastic spherical block includes a core material made of metal and an engineering plastic layer enclosing the core material.

18. The spherical bearing of claim 17, wherein a groove or a through hole is formed in the core material and the engineering plastic is pressed in to the groove or through hole.

19. A plastic spherical block for spherical bearing, being formed with an engineering plastic with a hardness of 75 D through 95 D, wherein the engineering plastic includes one selected from the group consisting of polyamide (PA), polyacetal or polyoxymethylene (POM), polyethylene terephthalate (PET), polysulfone resin (PSU), polyether sulfone (PES), polyphenylene sulphide (PPS), polyphenylene sulfone (PPSU), polyether imide (PEI), polyamide imide (PAI), polybenzimidazole (PBI), polyimide (PI) and polyether ether ketone (PEEK), and wherein the entire plastic spherical block is made of engineering plastic.

20. The plastic spherical block of claim 19, wherein a tensile elongation at break of the plastic spherical block is 15% or larger, a density of the plastic spherical block is 1.14-1.15 g/cm$^3$, and a compressive strength of the plastic spherical block is 950-1,100 kg/cm$^2$.

* * * * *